United States Patent

Watanabe et al.

[11] Patent Number: 5,774,884
[45] Date of Patent: Jun. 30, 1998

[54] SERVICE METHOD USING ON-LINE SYSTEMS OF FINANCIAL INSTITUTIONS

[75] Inventors: Akio Watanabe; Masakuni Terano, both of Tokyo, Japan

[73] Assignee: Moebius Corporation, Tokyo, Japan

[21] Appl. No.: 400,247

[22] Filed: Mar. 8, 1995

[30] Foreign Application Priority Data

Jan. 26, 1995 [JP] Japan .................................. 7-010281

[51] Int. Cl.$^6$ .................................................. G06F 17/60
[52] U.S. Cl. .................................................. 705/41
[58] Field of Search .................... 364/401 R, 404, 364/405, 406, 407, 408, 410, 412; 235/379, 380; 273/269; 395/217, 221, 235–244

[56] References Cited

U.S. PATENT DOCUMENTS

| | | | |
|---|---|---|---|
| 4,997,188 | 3/1991 | Nilssen | 364/408 |
| 5,083,782 | 1/1992 | Nilssen | 364/408 |
| 5,085,435 | 2/1992 | Rossides | 364/405 |
| 5,119,295 | 6/1992 | Kapur | 364/412 |
| 5,269,521 | 12/1993 | Rossides | 364/405 |
| 5,276,312 | 1/1994 | McCarthy | 235/380 |
| 5,329,589 | 7/1994 | Fraser et al. | 364/408 |
| 5,354,069 | 10/1994 | Guttman et al. | 273/439 |
| 5,513,102 | 4/1996 | Auriemma | 364/408 |
| 5,546,523 | 8/1996 | Gatto | 395/156 |

*Primary Examiner*—James P. Trammell
*Attorney, Agent, or Firm*—Longacre & White

[57] ABSTRACT

A service is added to the mechanical use of dedicated terminals of a financial institution to thereby attain a differentiation of the financial institution from the other financial institutions. In executing a predetermined item of transaction by using a dedicated terminal, a lottery is performed on a magnetic code by a lottery system provided in a central computer processing system, and a predetermined advantage is imparted to the magnetic code when the lot falls upon it.

17 Claims, 5 Drawing Sheets

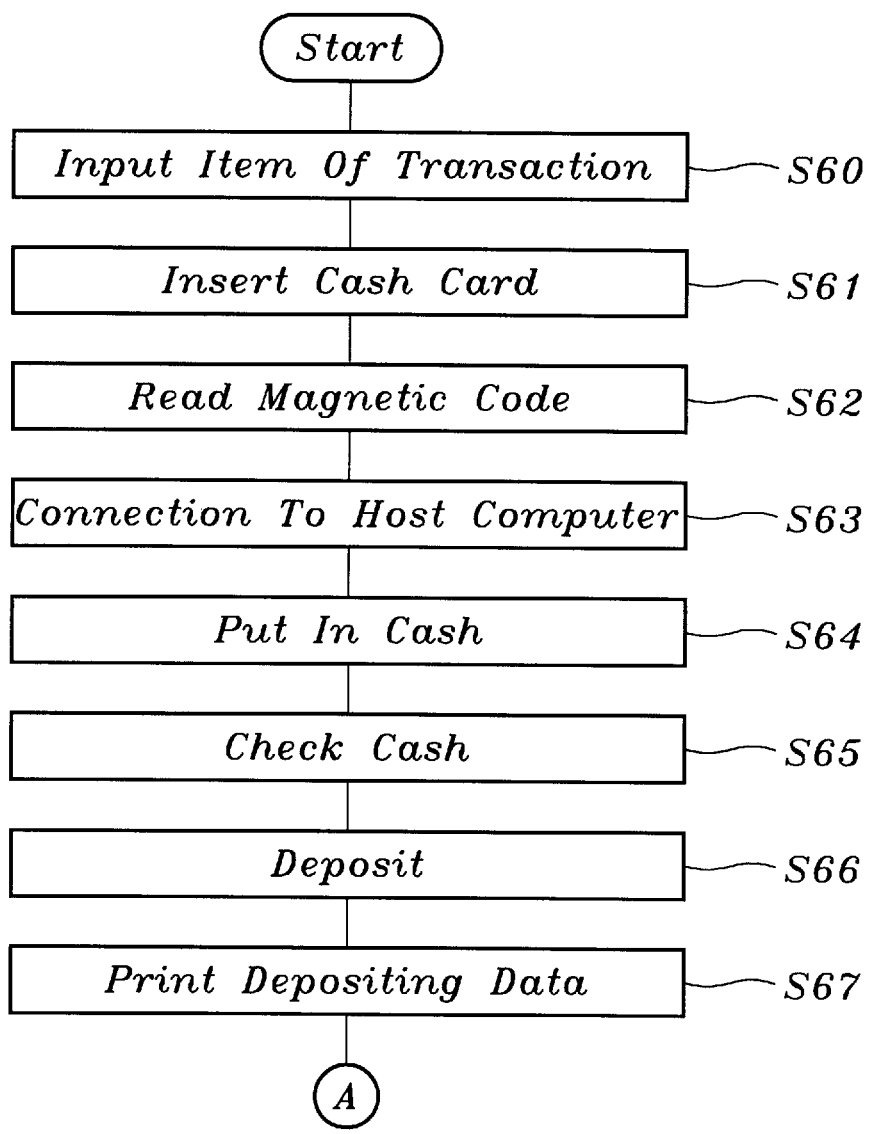

SERVICE METHOD USING ON-LINE SYSTEMS OF FINANCIAL INSTITUTIONS

BACKGROUND OF THE INVENTION AND DESCRIPTION OF THE RELATED ART

This invention relates to a service method using on-line systems of financial institutions. More specifically, this invention relates to a service method using on-line systems of financial institutions through a lottery, the method being executed when utilizing dedicated terminals which are installed in financial institutions, such as banks and post offices, or dedicated terminals which are connected to such financial institutions but installed outside these financial institutions.

Various customer winning measures have conventionally been taken in many industries.

Of such customer winning measures, it has been regarded to be of first importance to attract customers.

In this context, it has been a prerequisite, especially for financial institutions, to have their customers utilize their services although they eventually aim to attain an increase in deposit or loan amount to thereby make a profit.

Nowadays, in particular, the number of financial institutions that an individual deals with is increasing. Thus, it is important for a financial institution to have customers who deal with a number of financial institutions utilize their services more often than the services of the other institutions.

In view of this, many financial institutions have taken measures to differentiate their services from those of the other financial institutions.

One of such measures has been to directly attain a differentiation through impressive interest rates, for example, a high interest rate for deposit or a deposit system in which customers can enjoy a high interest rate through a lottery. Some financial institutions have been trying to attain such a differentiation, through an improved window-service quality, though such an effort is hard to directly recognize.

In utilizing the services of financial institutions, many customers operate dedicated terminals connected to central computer processing systems to thereby execute predetermined items of transaction.

Regarding these dedicated terminals, which are operated by the customers themselves, it is rather difficult for a financial institution to differentiate their services from those of other financial institutions. No effective means has been provided yet for attracting those customers who mainly utilize such dedicated terminals.

OBJECTS AND SUMMARY OF THE INVENTION

It is accordingly an object of the present invention to provide a service method using on-line systems of financial institutions according to which, when a given item of transaction is executed by using a dedicated terminal, a lottery is performed on magnetic codes used in utilizing dedicated terminals, by a lottery means provided in a central computer processing system, and in which, when the lot falls on a magnetic code, a predetermined advantage means is imparted to that magnetic code, thereby making it possible to add a service to the use of dedicated terminals, which has been quite mechanical, to thereby make it possible to differentiate the services of a financial institution from those of the other financial institutions and to continuously maintain a satisfactory, long-term relationship between that financial institution and their customers, thereby securing the customers using the dedicated terminal and attaining an increase in the number of times that it is utilized.

Another object of the present invention is to provide a service method using on-line systems of financial institutions according to which lottery is performed through comparison with a previously stored winning code group, thereby simplifying the lottery itself, and in which winning codes, which can be determined at random, are arbitrarily determined beforehand, thereby making it possible to provide services exclusively for customers selected from among a group of customers to whom the financial institution intends to offer services.

Still another object of the present invention is to provide a service method using on-line systems of financial institutions according to which the lottery is randomly conducted, so that it is possible to offer services to all the customers in an even probability.

A further object of the present invention is to provide a service method using on-line systems of financial institutions according to which the lottery is randomly executed after comparison with a previously stored winning code group, so that the number of customers on which the random lottery is to be performed decreases, thereby making it easier to perform the random lottery. Further, due to this arrangement, it is possible to determine a group of customers to whom a financial institution intends to offer services by arbitrarily determining winning code beforehand, and then offer services to the customers among the customer group in an even probability.

A still further object of the present invention is to provide a service method using on-line systems of financial institutions according to which the lottery is only performed when the number of times that a given item of transaction is executed has reached a predetermined value, thereby making it possible for a financial institution to give preferential treatment to customers who frequently utilize their service.

A still further object of the present invention is to provide a service method using on-line systems of financial institutions according to which the items of transaction are restricted to ones involving transfer of cash, whereby services can be offered in connection with transactions profitable to the financial institution, for example, depositing, withdrawal, and transfer.

A still further object of the present invention is to provide a service method using on-line systems of financial institutions according to which the lottery is executed only when the amount of cash transferred has reached a predetermined amount, whereby services can be offered in connection with transactions profitable to the financial institution.

A still further object of the present invention is to provide a service method using on-line systems of financial institutions according to which the advantage offered to the customers is the right to obtain a predetermined item of merchandise, thus providing a merchandise offering service.

A still further object of the present invention is to provide a service method using on-line systems of financial institutions according to which the advantage offered to the customers is the right to obtain a predetermined item of merchandise at a discount, thus providing a discount coupon offering service.

A still further object of the present invention is to provide a service method using on-line systems of financial institutions according to which the predetermined advantage offered can be displayed through dedicated terminals, thereby making it easier to recognize the lottery results.

A still further object of the present invention is to provide a service method using on-line systems of financial institutions according to which the predetermined advantage offered is printed out through dedicated terminals, whereby the customer is enabled to easily obtain the item of merchandise or the discount coupon, or the printed slip itself can be used as the discount coupon.

To achieve the above objects, there is provided, a service method using on-line systems of financial institutions, wherein, in executing a predetermined item of transaction by operating a dedicated terminal connected to a central computer processing system of a financial institution, the dedicated terminal is provided with an apparatus for reading a transactor recognizing medium equipped with a magnetic code; wherein the central computer processing system is provided with a magnetic code lottery means; and wherein, in executing the predetermined item of transaction through the transactor recognizing medium by using the dedicated terminal, a lottery is performed on the magnetic code of the transactor recognizing medium by the magnetic code lottery means of the central computer processing system, a predetermined advantage being imparted to the transactor recognizing medium when the lot falls upon it.

According to the invention, there is provided, in addition to the construction of claim 1, an arrangement wherein the magnetic code lottery means provided in the central computer processing system is a means for comparison with a previously stored winning code group, the comparison being effected by a lottery start signal emitted when executing an item of transaction.

According to the invention, there is provided, in addition to the construction described above, an arrangement wherein the magnetic code lottery means provided in the central computer processing system is a means for random lottery effected by a lottery start signal emitted when executing an item of transaction.

According to the invention, there is provided, in addition to the construction described above, an arrangement wherein the magnetic code lottery means provided in the central computer processing system is a means for a random lottery that is executed on magnetic codes judged to be winning ones by a means for comparison with a previously stored winning code group, the random lottery being effected by a lottery start signal emitted when executing the item of transaction.

According to the invention, there is provided, in addition to the construction of an arrangement wherein the lottery executed by the magnetic code lottery means provided in the central computer processing system is executed only when the number of times that the item of transaction is executed has reached a predetermined value.

According to the invention, there is provided, in addition to the construction an arrangement wherein the item of transaction is restricted to a one involving transfer of cash.

According to the invention, there is provided, in addition to the construction described above, an arrangement wherein the lottery executed by the magnetic code lottery means provided in the central computer processing system is executed only when the amount of cash transferred has reached a predetermined value.

According to the invention, there is provided, in addition to the construction an arrangement wherein the predetermined advantage consists of the right to obtain a predetermined item of merchandise.

According to the invention, there is provided, in addition to the construction described above, an arrangement wherein the predetermined advantage consists of the right to obtain a predetermined item of merchandise at a discount.

According to the invention, there is provided, in addition to the construction described above, an arrangement wherein the predetermined advantage can be displayed through the dedicated terminal.

According to the invention, there is provided, in addition to the construction described above, an arrangement wherein the predetermined advantage can be printed out by a printer that the dedicated terminal has.

According to the invention, in executing a predetermined item of transaction by operating a dedicated terminal connected to a central computer processing system of a financial institution, the dedicated terminal is provided with an apparatus for reading a transactor recognizing medium equipped with a magnetic code, and the central computer processing system is provided with a magnetic code lottery means.

Further, in executing the predetermined item of transaction through the transactor recognizing medium by using the dedicated terminal, a lottery is performed on the magnetic code of the transactor recognizing medium by the magnetic code lottery means of the central computer processing system, and, a predetermined advantage is imparted to the transactor recognizing medium when the lot falls upon it.

Here, the term "financial institution" means an institution which has money on deposit, loans, advances money for a fixed period, etc., for example, a bank, post office, credit association, consumer loan firm, installment firm, credit firm, etc.

The term "central computer processing system of the financial institution" means a system in which depositing, withdrawal, transfer, borrowing, etc. can be effected by getting access to a so-called host computer storing the ledger files of the financial institution.

The term "dedicated terminal" means, in the case, for example, of a bank, ATM, CD, etc. used therein, and those POS installed in stores and connected to the central computer processing system of a financial institution.

The "transactor recognizing medium" means a medium which, when money is withdrawn from a financial institution, helps to confirm that it is the right withdrawer. It consists, for example, of a cash card, bankbook, consumer loan card, credit card, house card that is similar to a credit card, etc.

The "predetermined item of transaction" means, apart from the various transactions conducted between the financial institution and the customers, such as depositing, withdrawal, transfer, and balance checking, fund transfer transactions effected through POS used in stores.

The "magnetic code" means a magnetic code attached to the transactor recognizing medium. There are no two mediums having the same code.

The "lottery" means the operation of selecting a fixed number of customers from customers who have executed a predetermined item of transaction, the selection being effected by means of the magnetic codes.

The "advantage" means a treatment that people who are selected through the lottery can enjoy but people who are not selected cannot.

In accordance with the invention, when a predetermined item of transaction is conducted in a financial institution or the like by using a dedicated terminal, a lottery is executed with the transaction, and, when the lot falls on the transactor, he or she can obtain the advantage.

In accordance with the invention, the lottery is executed through comparison with a previously stored winning code group. It is also possible for the winning code group to be classified into high-ranking and low-ranking winning codes.

Thus, the lottery operation can be simplified. Further, while it is possible for the winning codes to be previously determined at random by day, week, month, etc., it is also possible for the winning codes to be arbitrarily determined beforehand, whereby services can be offered exclusively to those customers who have actually utilized their services from a group of customers to whom the financial institution intends to offer services.

In accordance with the invention, the lottery is executed randomly each time.

Here, the "random lottery" means, for example, an arrangement in which the winning numbers are previously determined, for example, to be 1 through 10, and in which one number is selected from among the numbers of 1 through 100 on a random-number basis, any selected number that is in the range of 1 to 10 being a winning one. When such a random lottery is conducted, it is also possible to classify the winning numbers, for example, such that 1 through 3 are high-ranking winning numbers and that 4 through 10 are low-ranking winning numbers.

Due to this arrangement, it is possible to offer services to all the customers in an even probability.

In accordance with the invention, a random lottery is further conducted after comparison with the previously stored winning code group.

Thus, the number of customers to be subjected to the random lottery is reduced, thereby facilitating the random lottery process. Moreover, by arbitrarily determining the winning codes beforehand, it is possible to first determine a group of customers to whom the financial institution intends to offer services and then offer a service in an even probability to those customers who have actually utilized the services of the financial institution.

In accordance with the invention, the lottery is executed only when the number of times that a predetermined item of transaction is conducted has reached a predetermined value.

Due to this arrangement, it is possible to give preferential treatment to customers who frequently utilize their service, so that it is possible to continuously maintain a satisfactory, long-term relationship between that financial institution and their customers and to expect an increase in the frequency of visit and frequency of use of the terminals.

In accordance with the invention, the items of transaction are restricted to ones involving transfer of cash.

Due to this arrangement, services can be offered in connection with transactions profitable to the financial institution, for example, depositing, withdrawal, and transfer.

In accordance with the invention, the lottery is executed only when the amount of cash transferred has reached a predetermined value.

Due to this arrangement, services can be offered in connection with transactions profitable to the financial institution, so that an increase in profit for the financial institution can be expected through an increase in the amount of money handled by the customers.

In accordance with the invention, the advantage offered to the customers is the right to obtain a predetermined item of merchandise.

Due to this arrangement, a merchandise offering service can be given to the customers on whom the lot has fallen. Further, it is also possible to classify the winners into high-ranking and low-ranking winners, differentiating the kinds of merchandise accordingly. Further, it is also possible to provide a plurality of kinds of merchandise for the winners of the same rank, leaving it to the customers to select the one they prefer.

In accordance with the invention, the advantage offered to the customers is the right to obtain a predetermined item of merchandise at a discount.

Here, "the right to obtain a predetermined item of merchandise at a discount" means the right to purchase a predetermined item of merchandise at a certain discount. Specifically, it may be possible to offer a discount coupon.

Due to this arrangement, a discount coupon offering service can be given. Further, this makes it possible to expect an invigoration of not only the financial institution but also the area around it through cooperation with stores, etc. in the neighborhood.

In accordance with the invention, the predetermined advantage offered can be displayed through dedicated terminals.

Here, the display may be given through a display device or it may be an indication given in a voice.

Due to this arrangement, it is made easier for the customer to recognize the lottery results, thereby keeping the customer from being uninformed when he or she wins.

In accordance with the invention, the predetermined advantage offered is printed out by a printer provided in the dedicated terminal.

Due to this arrangement, the customer is enabled to easily obtain the item of merchandise or the discount coupon in exchange for the printed slip, or the printed slip itself can be used as the discount coupon.

BRIEF DESCRIPTION OF THE DRAWINGS

FIG. 6 is a flowchart illustrating an operation flow in the case of depositing, from depositing start to deposit data printing.

DETAILED DESCRIPTION OF A PREFERRED EMBODIMENT:

An embodiment of the present invention will now be described with reference to the drawings.

Figure 1:
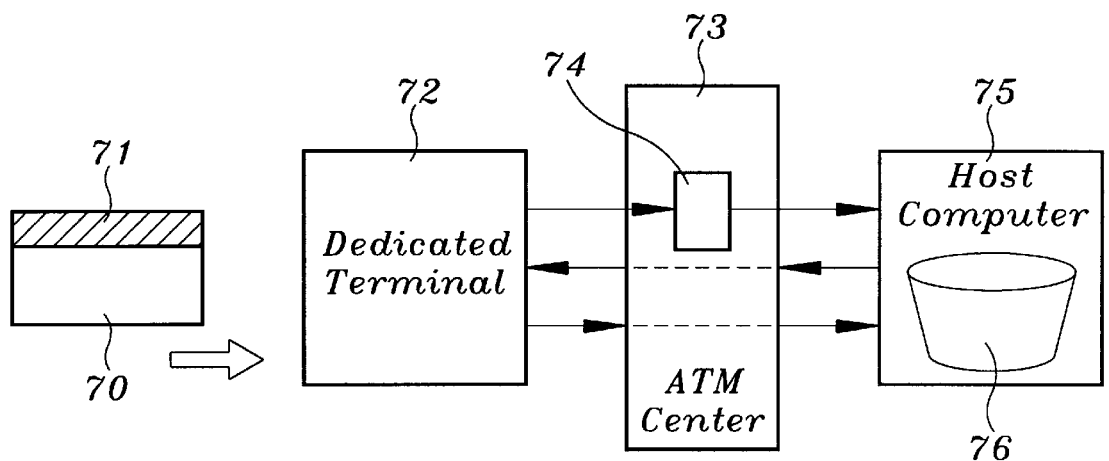
FIG. 1 is a schematic diagram illustrating a central computer processing system as used in financial institutions.
Figure 3:
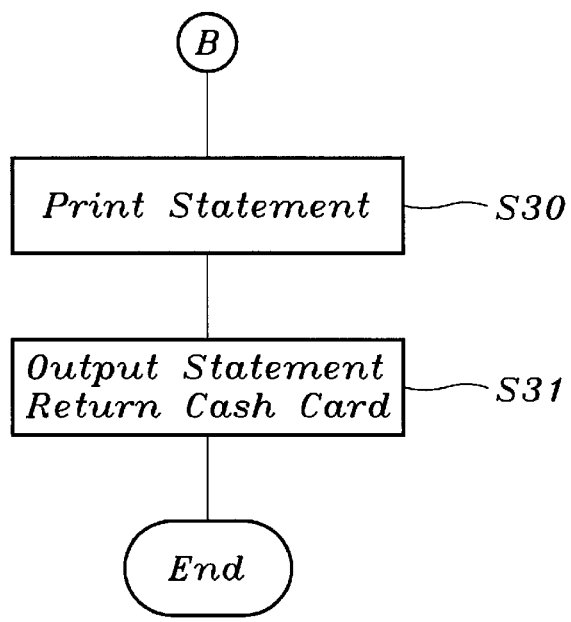
FIG. 3 is a flowchart illustrating an operation flow from the statement printing upon the completion of the transaction to the termination of the entire operation.
Figure 2:
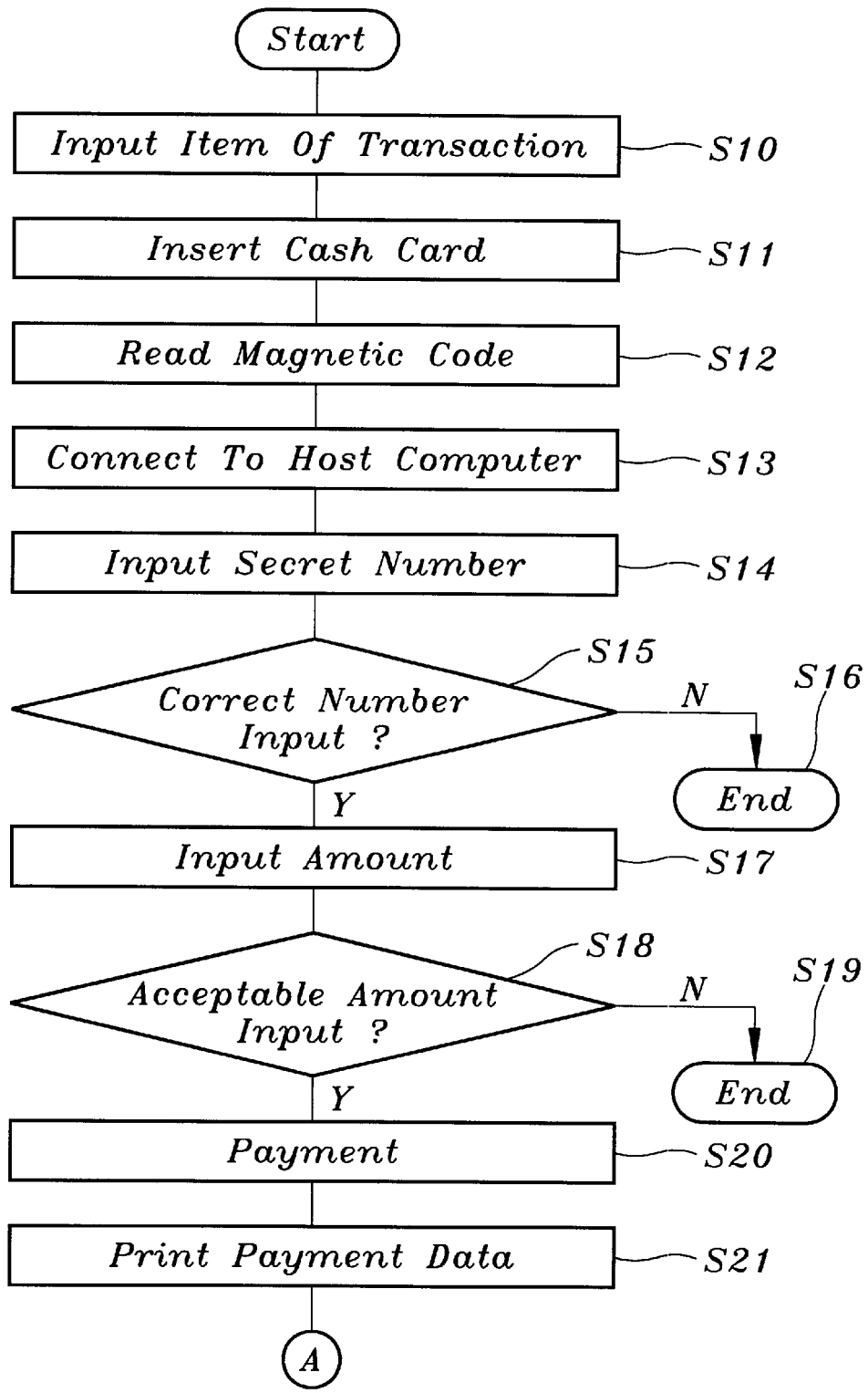
FIG. 2 is a flowchart illustrating an operation flow in the case of cash withdrawal, from withdrawal start to payment data printing.
Figure 4:
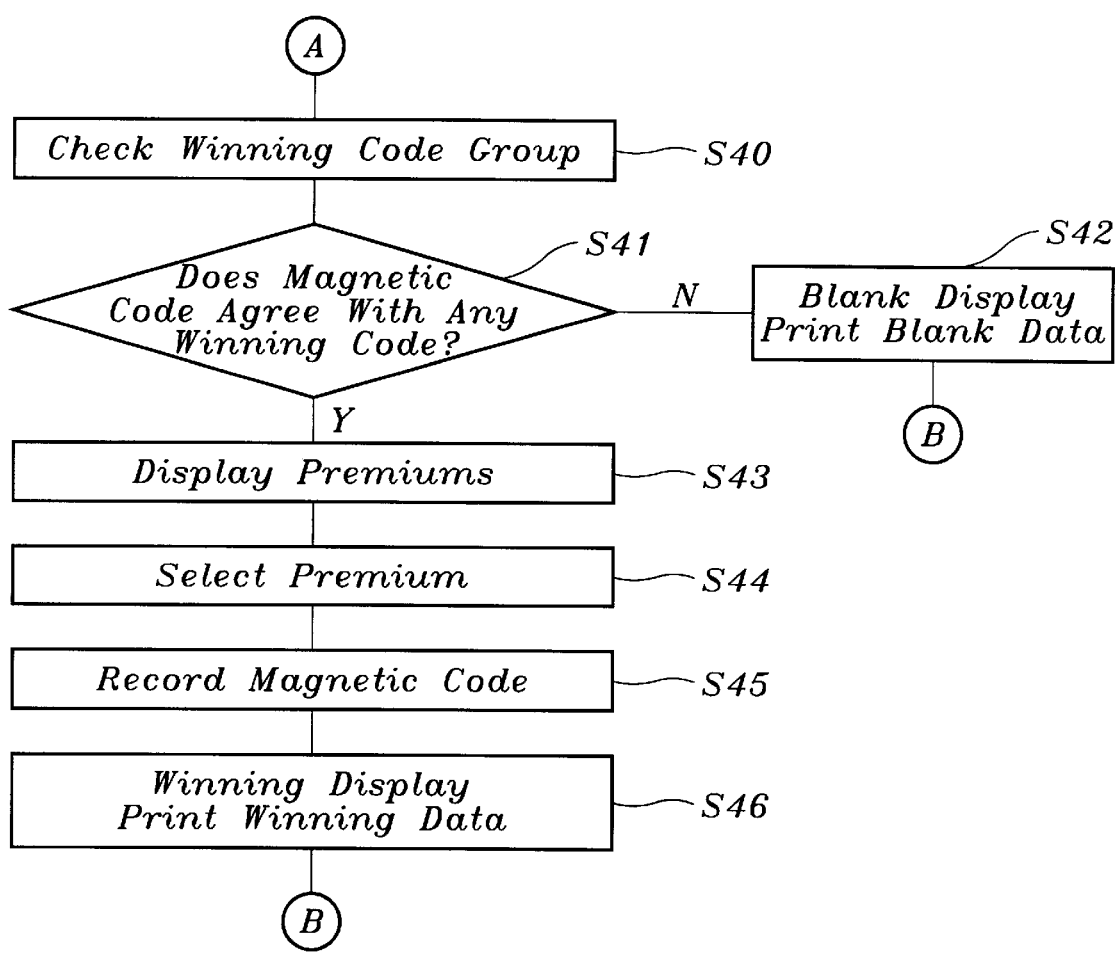
FIG. 4 is a flowchart illustrating lottery procedures when the lottery is executed through comparison with a previously stored winning code group.
Figure 5:
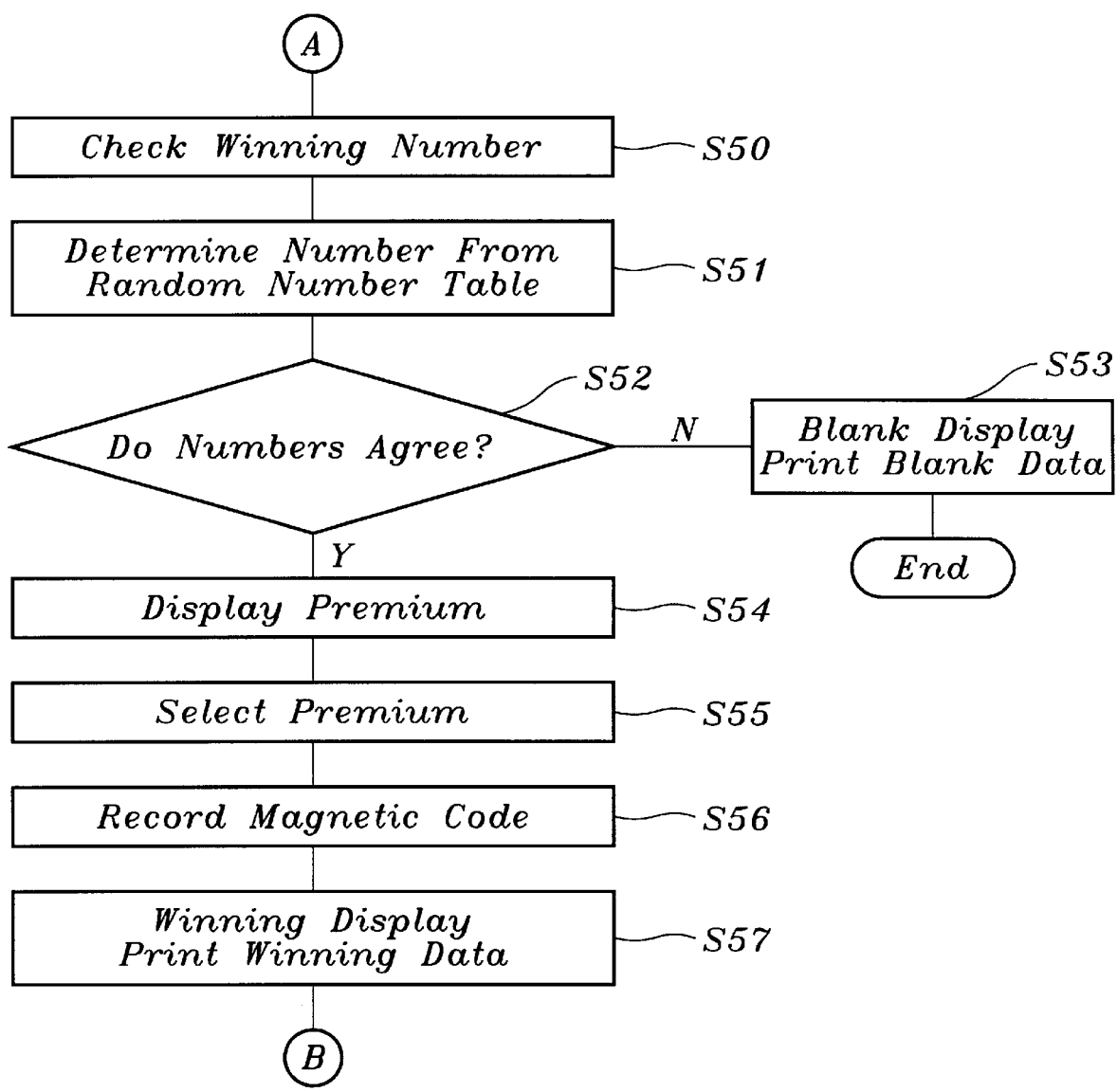
FIG. 5 is a flowchart illustrating lottery procedures when the lottery is executed randomly each time.

FIG. 1 is a schematic diagram illustrating a central computer processing system as used in financial institutions, and FIGS. 2 through 6 are flowcharts illustrating a service method according to the present invention, of which FIG. 2 is a flowchart illustrating an operation flow in the case of cash withdrawal, from withdrawal start to payment data printing; FIG. 3 is a flowchart illustrating an operation flow from the statement printing effected upon the completion of the transaction to the end of the operation; FIG. 4 is a flowchart illustrating lottery procedures when the lottery is executed through comparison with a previously stored winning code group; FIG. 5 is a flowchart illustrating lottery procedures when the lottery is executed randomly each time; and FIG. 6 is a flowchart illustrating an operation flow in the case of depositing, from depositing start to deposit data printing.

First, a central computer processing system as used in financial institutions will be schematically illustrated with reference to FIG. 1.

In a central computer processing system as used in financial institutions, an ATM center 73 is provided between a dedicated terminal 72 installed in each financial institution and a host computer 75 equipped with a data base 76.

Here, the ATM center 73 effects connection, through a switching circuit 74, between the dedicated terminal 72 and the host computer 75.

By inserting, for example, a cash card that is equipped with a magnetic code, the operations illustrated in FIGS. 2 through 6 are executed.

In what is called a cashless shopping, a bank cash card is used.

Here, the term "cashless shopping" means a kind of service in which a POS terminal possessed by a distribution dealer and a computer of a bank are connected to each other through a communication line, and in which the payment for the items of merchandise and services are settled on a real-time basis through transfer from the bank account of the customer to that of the store.

In this case, a CAFIS center (a credit authorization network offered by NTT Data Communication Kabushiki Kaisha) is used instead of the ATM center mentioned above.

In the CAFIS center, switching from the POS terminal of the distribution dealer to the host computer of the bank is effected in the time period in which the on-line service of the bank is in operation.

This cashless shopping service is also used when the the on-line service of the bank is out of operation. In this case, it is necessary for the POS user to previously enter into a loan contract with the bank. When the POS user satisfies this prerequisite, the CAFIS center receives sales data from the distribution dealer, and checks data on the object for which they pay for the customer and information on the customer and performs an agency process with respect to the sales file, transmitting the resultant data to the distribution dealer from whom they received communication. When the CAFIS center has ascertained the on-line start of the bank center concerned, the CAFIS center transmits the sales data of the agency sales file to the host computer of the bank. As a result, an amount of money corresponding to the sales price used in the on-line-off period is transferred from the bank account of the customer to that of the distribution dealer.

When a credit card, for example, a VISA card is used, the credit authorization network of VISA is used instead of the CAFIS center, and, connection is effected to the host computer of the card company instead of to the host computer of the bank.

Next, the actual operation of the method of this invention will be described with reference to FIGS. 2 through 6.

First, the procedures in the case of cash withdrawal, from withdrawal start to payment data printing, will be described with reference to the flowchart of FIG. 2.

The series of procedures are successively illustrated in steps 10 to 21 of FIG. 2.

Subsequent to the operation start, "transaction item input" is effected in step 10.

The term "transaction item" implies various kinds of transaction to be executed between the customer and the financial institution, for example, depositing, withdrawal, transfer, or balance checking. First, the item of transaction to be executed is selected at the dedicated terminal. In this flowchart, the item of transaction "withdrawal" is selected.

Thus, it will be assumed that "withdrawal" is selected and input in step 10.

Then, in step 11, the indication "insert cash card" is given on the dedicated terminal, and the customer inserts the cash card into a slot (not shown).

Next, in step 12, the operation of "magnetic code reading" is conducted. In this operation, the magnetic code of the inserted cash card is read in the dedicated terminal.

Subsequently, in step 13, the operation of "connection to host computer" is conducted. In this operation, connection to the host computer is effected on the basis of the magnetic code read in step 12, making it possible to conduct the operation of "number checking" in step 15 or the operation of "amount checking" in step 18.

Then, the operation of "secret number input" is executed in step 14.

Thereupon, the "number checking" of step 15 is executed. Here, the secret number, which corresponds to the magnetic code read in step 12, is compared with the secret number input in step 14. When the numbers do not agree with each other, the operational flow is stopped in step 16, and the subsequent procedures cannot be executed. However, since it is possible for the number to have been erroneously input, the operation of "secret number input" in step 14 and the operation of "number checking" in step 15 are conducted again if there is a discrepancy in the "number checking" of step 15. These operations can be usually repeated three times or so.

When the numbers agree with each other in step 15, the procedure advances to "amount input" in step 17.

In this step 17 also, an indication of "amount input" is given through the dedicated terminal, and the customer inputs a desired amount.

Next, in step 18, the operation of "amount checking" is conducted. In this "amount checking", connection to the host computer is effected on the basis of the magnetic code read in step 12 to check whether the desired amount is beyond or within the balance.

When the input amount is beyond the deposit balance, the procedures are terminated in step 19. However, in that case also, an indication is given to the effect that "the balance is short of the desired amount", etc., and the operation of "amount input" in step 17 is conducted again.

When it is determined in step 18 that the amount to be withdrawn is within the deposit balance, the operation of "payment" for paying the input amount is conducted in step 20, and, further, in step 21, an indication of "payment data printing" is given, the procedure advancing to A. Here, the payment data printing consists in printing of a statement.

Next, a lottery executed through comparison with a previously stored group of winning codes will be described with reference to the flowchart of FIG. 4.

Here, the procedures from step A of FIG. 2 onward are illustrated.

First, the operation of "checking the winning code group": is conducted in step 40. This is conducted for the purpose of checking to see what kind of codes the predetermined winning code group are.

Here, the term "group of winning codes' means a plurality of codes previously selected from the magnetic codes of cash cards as winning codes. Further, it is also possible to classify the winning code group into high-ranking and low-ranking winning codes. Further, while it is possible to previously determine the winning codes randomly by day, week, month, etc., it is also possible to arbitrarily determine the winning codes beforehand, thereby making it possible to offer services exclusively to those customers who have actually utilized their services and who are among a group of customers to whom the financial company intends to offer services.

Next, a judgment is made in step 41 as to whether "the winning code and the magnetic code agree with each other or not".

When they do not agree with each other, it means that the magnetic code is a blank, and the operation of "blank display, blank data printing" is conducted in step 42. Here, the blank display is given through the dedicated terminal and the blank data printing is effected on the statement slip.

When, conversely, it is determined in step 41 that the winning code and the magnetic code agree with each other, the display of "premium merchandise" is given through the dedicated terminal in step 43.

Then, the customer performs "merchandise selection" in step 44. This is performed when a plurality of items of premium merchandise are displayed in step 43 and selection from them is possible. Thus, when there is only one item of premium merchandise displayed in step 43, this step 44 is unnecessary.

Next, to record the winning in the magnetic code of the cash card, the operation of "magnetic code recording" is performed in step 45.

After this, in step 46, the operation of "winning display, winning data printing" is conducted. Here, the winning display is given through the dedicated terminal, and the winning data is printed on the statement slip.

When the above operations have been completed, the procedure advances to B.

Next, the procedures from B onward will be described with reference to FIG. 3.

First, the operation of "statement printing" is conducted in step 30. In this printing process, the printing regarding the item of transaction in accordance with the "payment data printing" in step 21 of FIG. 2 and the printing in accordance with the "blank data printing" in step 42 or the "winning data printing" in step 46 are effected simultaneously on the statement slip.

Then, the operation of "statement output, cash card returning" is conducted in step 31, and the series of withdrawal procedures are terminated.

Next, the lottery procedures when the lottery is randomly conducted each time will be described with reference to the flowchart of FIG. 5.

This lottery is conducted through procedures existing between A of the flowchart of FIG. 2 and B of the flowchart of FIG. 3.

First, the operation of "winning number checking" is conducted in step 50. When, for example, one number is to be selected from the numbers of 1 through 100 on a random-number basis, certain numbers among them, for example, 1 through 10, are determined as winning numbers beforehand.

Next, in step 51, the operation of "determining number from random number table" is executed.

Then, in step 52, a judgment is made as to whether "the numbers agree with each other or not".

When, for example, the number is winning is a winning one that is among 1 through 10 as determined in step 50, such as 2 or 5, it is determined that the numbers agree, and, when the number is 11 or more, the number is a blank.

Due to this arrangement, it is possible to offer services to all the customers in an even probability.

When, in step 52, no agreement in number is attained, the number in question is a blank, so the operation of "blank display, blank data printing" is conducted in step 53. Here, the blank display is given through the dedicated terminal, and the blank data printing is effected on the statement slip.

When, conversely, it is determined that there is agreement in number in step 52, the operation of "premium merchandise display" is executed through the dedicated terminal in step 54.

Then, the customer performs "merchandise selection" in step 55. This is performed when a plurality of items of premium merchandise are displayed in step 54 and selection from them is possible. Thus, when there is only one premium merchandise displayed in step 54, this step 55 is unnecessary.

Next, to record the winning in the magnetic code of the cash card, the operation of "magnetic code recording" is performed in step 56.

After this, in step 57, the operation of "winning display, winning data printing" is conducted. Here, the winning display is given through the dedicated terminal, and the winning data is printed on the statement slip.

When the above operations have been completed, the procedure advances to B.

Next, the procedures in the case of depositing, from depositing start to deposit data printing, will be described with reference to the flowchart of FIG. 6.

Subsequent to the operation start, "transaction item input" is effected in step 60.

The term "transaction item" implies various transactions to be executed between the customer and the financial institution, for example, depositing, withdrawal, transfer, or balance checking. First, the item of transaction to be executed is selected at the dedicated terminal. In this flowchart, the item of transaction "depositing" is selected.

Thus, it will be assumed that "depositing" is selected and input in step 60.

Then, in step 61, the indication "insert cash card" is given on the dedicated terminal, and the customer inserts the cash card into a slot (not shown).

Next, in step 62, the operation of "magnetic code reading" is conducted. In this operation, the magnetic code of the inserted cash card is read in the dedicated terminal.

Subsequently, in step 63, the operation of "connection to host computer" is conducted. In this operation, connection to the host computer is effected on the basis of the magnetic code read in step 62.

Then, the operation of "cash putting-in" is executed in step 64.

Specifically, a cash inlet hole of the dedicated terminal opens, and the customer puts in a desired amount of cash therein.

Next, in step 65, the operation of "cash checking" is conducted. In this cash checking operation, the cash put in the inlet hole is usually counted first, and then the amount is displayed on the dedicated terminal, the checking operation being completed with a check signal from the customer.

After the completion of this cash checking operation, the operation of "deposit process" is conducted in step 66. This is a process in which an amount of money corresponding to the cash thus checked is transferred to the account of the customer.

After this, in step 21, the operation of "payment data printing" is designated, and the procedure advances to A. Here, the "payment data printing" is effected on the statement slip.

Thus, after this, the procedure moves to the operation flow of FIG. 4 or 5. Further, when the operation of flow of FIG. 4 or 5 has been terminated, the procedure advances to the operation flow of FIG. 2.

While in the above description the lottery procedures illustrated in FIGS. 4 and 5 are of two types: the lottery executed through comparison with a previously stored winning code group and the random lottery, it is also possible to adopt some other type of lottery operation as long as it is an operation by which a certain number of customers are selected from among customers who have executed a predetermined item of transaction, by using magnetic codes as the medium.

In particular, it is also possible to adopt a random lottery in which step 50 of FIG. 5 is connected to the YES of step 41 of FIG. 4 to further perform random lottery after the comparison with the previously stored winning code group.

Due to this arrangement, the number of customers to be subjected to the random lottery is reduced, so that the random lottery operation is facilitated. Further, by arbitrarily determining the winning codes beforehand, it is possible to first determine a group of customers to whom the financial institution intends to offer services and then offer a service in an even probability to those customers who have actually utilized the services of the financial institution.

Further, the lottery can be only performed when the number of times that a given item of transaction is executed has reached a predetermined value, thereby making it possible for a financial institution to give preferential treatment to customers who frequently utilize their service.

Further, the items of transaction connected with the lottery may be restricted to ones involving transfer of cash, whereby a service can be offered in connection with transactions profitable to the financial institution, for example, depositing, withdrawal, and transfer.

Further, it is also possible for the lottery to be executed only when the amount of cash transferred has reached a predetermined value, whereby a service can be offered in connection with transactions profitable to the financial institution.

Further, while in the flowchart shown in FIG. 2, the checking with the host computer consisted in the "number check" in step 15 and the "amount check" in step 18, a single checking operation with the host computer suffices when, for example, the "secret number input" in step 14 and the "amount check" in step 17 are conducted first and then the secret number and the amount are simultaneously checked.

Further, since in the above description the advantage offered through lottery was "merchandise selection", it is possible for the customer to obtain the item of merchandise in exchange for the statement slip with the name of the item of merchandise printed thereon by bringing the slip to a predetermined place.

Apart from this, the advantage offered through the lottery may also be the right to obtain a predetermined item of merchandise at a discount, the advantage being offered in the form of a "discount coupon". Due to this arrangement, it is possible to expect invigoration of not only the financial institution but the area around it through cooperation with stores, etc. in the neighborhood.

Further, in an embodiment, the lottery results can be displayed on the display of the dedicated terminal. Apart from this, the lottery results may be indicated in a voice.

When the lottery results are thus indicated, the customer is enabled to recognize the results easily, and, if the customer wins the lottery, he is kept from being left uninformed of the fact.

Further, in an embodiment, the lottery results are printed out by a printer provided in the dedicated terminal. Due to this arrangement, the printed slip can be easily exchanged for an item of merchandise, a discount coupon, etc., or the slip itself can be used as the discount coupon.

As described above, according to the invention, there is provided a service method using on-line systems of financial institutions according to which, when a given item of transaction is executed by using a dedicated terminal, a lottery is performed on magnetic codes used in utilizing dedicated terminals by a lottery means provided in a central computer processing system, and in which, when a magnetic code is selected through the lottery, a predetermined advantage is imparted to that magnetic code, thereby making it possible to add a service regarding the mechanical use of dedicated terminals to thereby enable the services of a financial institution to be differentiated from those of the other financial institutions and to continuously maintain a satisfactory, long-term relationship between that financial institution and their customers, thereby securing the customers using the dedicated terminal and attaining an increase in the number of times that it is utilized.

According to the invention, there is provided, in addition to the effect of the invention as described above, an arrangement in which a lottery is performed through comparison with a previously stored winning code group, thereby simplifying the lottery itself, and in which winning codes, which can be determined at random, are arbitrarily determined beforehand, thereby making it possible to provide services exclusively for customers selected from among a group of customers to whom a financial institution intends to offer services.

According to the invention, there is provided, in addition to the effect of the invention as described above, an arrangement in which the lottery is randomly conducted, so that it is possible to offer a service to all the customers in an even probability.

According to the invention, there is provided, in addition to the effect of the invention as an arrangement in which the lottery is randomly executed after comparison with a previously stored winning code group, so that the number of customers on which the random lottery is to be performed decreases, thereby making it easier to perform the random lottery. Further, due to this arrangement, it is possible to determine a group of customers to whom a financial institution intends to offer services by arbitrarily determining winning codes, and then offer services to customers who are among the customer group in an even probability.

According to the invention, there is provided, in addition to the effect of the invention as described above, an arrangement in which the lottery is only performed when the number of times that a given item of transaction is executed has reached a predetermined value, thereby making it possible for a financial institution to give preferential treatment to customers who frequently utilize their services.

According to the invention, there is provided, in addition to the effect of the invention as described above, an arrangement in which the items of transaction are restricted to ones involving transfer of cash, whereby services can be offered in connection with transactions profitable to the financial institution, for example, depositing, withdrawal, and transfer.

According to the invention as claimed, there is provided, in addition to the effect of the invention as described above, an arrangement in which the lottery is executed only when the amount of cash transferred has reached a predetermined amount, whereby services can be offered in connection with transactions profitable to the financial institution.

According to the invention, there is provided, in addition to the effect of the invention as described above, an arrangement in which the advantage offered to the customers is the right to obtain a predetermined item of merchandise, thus providing a merchandise offering service.

According to the invention, there is provided, in addition to the effect of the invention as described above, an arrangement in which the advantage offered to the customers is the right to obtain a predetermined item of merchandise at a discount, thus providing a discount coupon offering service.

According to the invention, there is provided, in addition to the effect of the invention as described above, an arrangement in which the predetermined advantage offered can be displayed through dedicated terminals, thereby making it easier to recognize the lottery results.

According to the invention, there is provided, in addition to the effect of the invention as described above, an arrangement in which a predetermined advantage offered is printed out through dedicated terminals, whereby the customer is enabled to easily obtain the item of merchandise or the discount coupon in exchange for the printed slip, or the printed slip itself can be used as the discount coupon.

It should be understood that the above-described embodiments of the present invention are illustrative and not restrictive. The scope of the invention is indicated by the appended claims, and all the modifications in the claims are covered by the present invention.

What is claimed is:

1. A service method using on-line systems of financial institutions, wherein, in executing a predetermined item of transaction by operating a dedicated terminal connected to a central computer processing system of a financial institution, the dedicated terminal is provided with an apparatus for reading a transactor recognizing medium equipped with a magnetic code;

the central computer processing system is provided with a magnetic code lottery means; and in executing the predetermined item of transaction through the transactor recognizing medium by using the dedicated terminal, a lottery is automatically performed on the magnetic code of the transactor recognizing medium by the magnetic code lottery means of the central computer processing system, a predetermined advantage being imparted to the transactor recognizing medium when the lot falls upon it.

2. A service method using on-line systems of financial institutions according to claim 1, wherein the magnetic code lottery means provided in the central computer processing system is a means for comparison with a previously stored winning code group effected by a lottery start signal emitted when executing the item of transaction.

3. A service method using on-line systems of financial institutions according to claim 1, wherein the magnetic code lottery means provided in the central computer processing system is a means for random lottery effected by a lottery start signal emitted when executing the item of transaction.

4. A service method using on-line systems of financial institutions according to claim 1, wherein the magnetic code lottery means provided in the central computer processing system is a means for random lottery that is executed on magnetic codes judged to be winning ones by a means for comparison with a previously stored winning code group, the random lottery being effected by a lottery start signal emitted when executing an item of transaction.

5. A service method using on-line systems of financial institutions according to claim 1, wherein the lottery by the magnetic code lottery means provided in the central computer processing system is executed only when the number of times that the item of transaction is executed has reached a predetermined value.

6. A service method using on-line systems of financial institutions according to claim 1, wherein the items of transaction are restricted to ones involving transfer of cash.

7. A service method using on-line systems of financial institutions according to claim 6, wherein the lottery by the magnetic code lottery means provided in the central computer processing system is executed only when the amount of cash transferred has reached a predetermined value.

8. A service method using on-line systems of financial institutions according to claim 1, wherein the predetermined advantage consists of the right to obtain a predetermined item of merchandise.

9. A service method using on-line systems of financial institutions according to claim 1, wherein the predetermined advantage consists of the right to obtain a predetermined item of merchandise at a discount.

10. A service method using on-line systems of financial institutions according to claim 1, wherein the predetermined advantage can be displayed through the dedicated terminal.

11. A service method using on-line systems of financial institutions according to claim 10, wherein the predetermined advantage can be printed out by a printer that the dedicated terminal has.

12. A method of automatically entering a patron of an on-line financial system into a lottery when said user conducts a transaction, said method comprising the steps of:

reading a magnetic code of a transactor recognizing medium associated with said patron when said patron conducts a transaction;

identifying a winning code group;

automatically comparing said magnetic code with said winning code group to identify a match;

automatically rewarding said patron with a predetermined advantage upon identification of said match;

wherein, said patron is entered into said lottery free of charge to promote use of said financial system.

13. A method according to claim 12, wherein step of rewarding said patron comprises the further steps of:

identifying a particular reward to be given to said user;

printing a coupon during said transaction, said coupon being redeemable for said particular reward.

14. A method according to claim 12, wherein said step of identifying a winning code group is randomly generated after reading said magnetic code.

15. A method according to claim 12, wherein said step of identifying said winning code group is obtained by looking up a previously stored winning code group.

16. A method according to claim 12, wherein said patron is automatically entered into said lottery after conducting a predetermined number of transactions.

17. A method according to claim 12, wherein said patron is automatically entered into said lottery after conducting a transaction exceeding a predetermined value.

* * * * *